Sept. 22, 1925.   1,554,472
E. P. T. R ULMANN
APPARATUS FOR TREATMENT OF PEAT MASS AND PRODUCTION OF PEAT FUEL
Filed Nov. 22, 1919    2 Sheets-Sheet 1
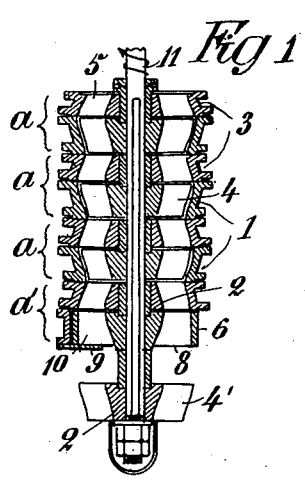
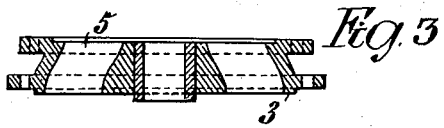
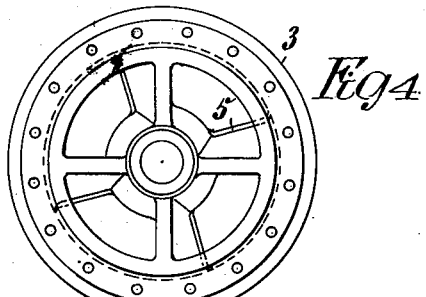
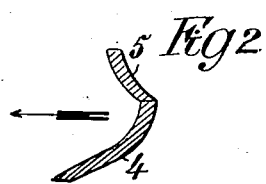
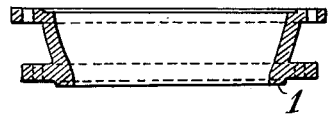
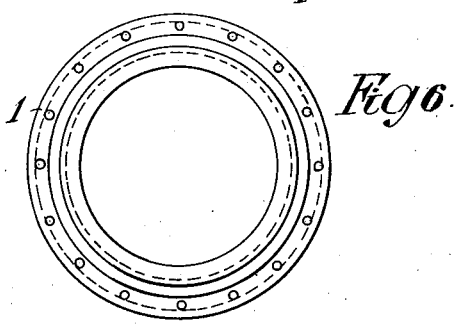
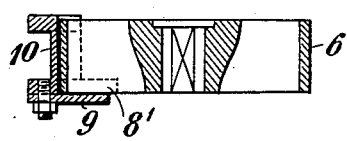
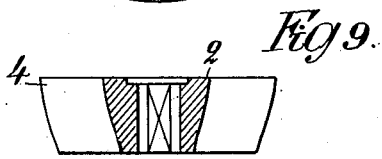
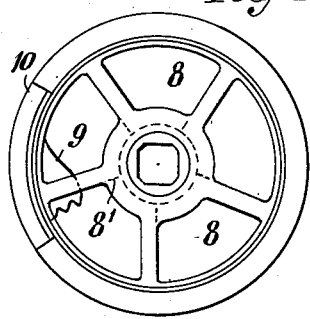

Sept. 22, 1925.
E. P. T. R ULMANN
1,554,472
APPARATUS FOR TREATMENT OF PEAT MASS AND PRODUCTION OF PEAT FUEL
Filed Nov. 22, 1919    2 Sheets-Sheet 2
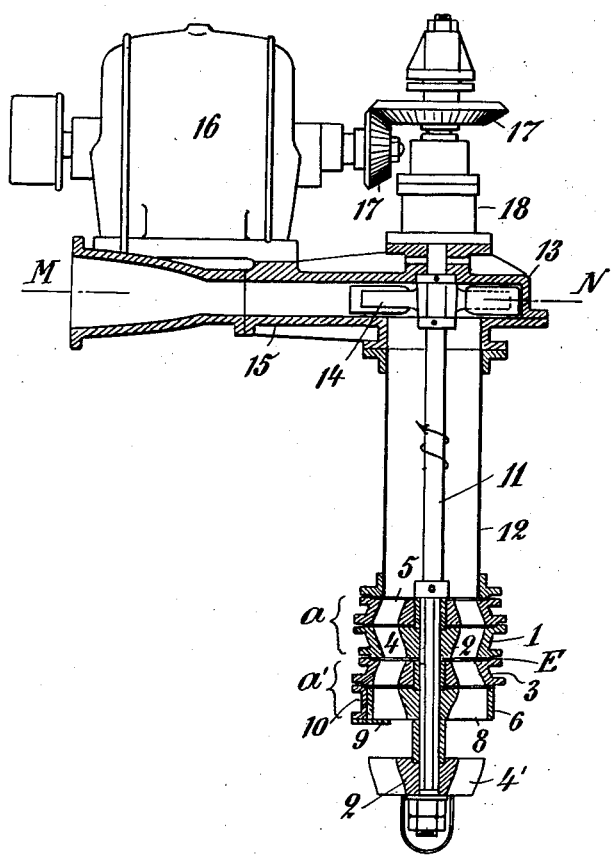
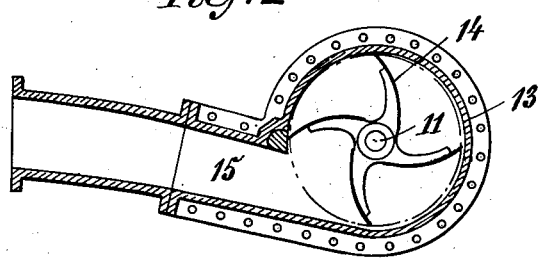
Inventor:
Edward Peter-Theodor Reinholdowitsch Ulmann
By Lawrence Langner
Attorney.

Patented Sept. 22, 1925.

1,554,472

UNITED STATES PATENT OFFICE.

EDUARD PETER-THEODOR REINHOLDOWITSCH ULMANN, OF VIBORG, FINLAND, ASSIGNOR TO THE FIRM AKTIESELSKABET HYDROPEAT, OF COPENHAGEN, DENMARK.

APPARATUS FOR TREATMENT OF PEAT MASS AND PRODUCTION OF PEAT FUEL.

Application filed November 22, 1919. Serial No. 339,874.

*To all whom it may concern:*

Be it known that I, EDUARD PETER-THEODOR REINHOLDOWITSCH ULMANN, a citizen of Russia, residing at Viborg, Finland, have invented certain new and useful Improvements in Apparatus for Treatment of Peat Mass and Production of Peat Fuel, of which the following is a specification.

The present invention relates to an apparatus for treatment of peat-mass and production of peat fuel and the invention is mainly characterized in that the peat-mass, at the same time as, or after it has been taken out of the moor, is worked into a porridge-like mixture being sufficiently liquid to be pumped through pipe-lines.

By working the peat-mass into a liquid mixture, two advantages are attained viz: one, that the peat-mass is then easy to transport and easy to distribute over the drying-place; and two, that the prepared peat-mass owing to its increased homogeneity dries in less time than is usually required.

The peat-mass to be used in the production of the peat-fuel may either be excavated in the ordinary manner and then mixed with water, or water may be added to the mass in the moor, whereafter the mass is pumped up, which will be the procedure if suitable apparatus using water are used for eroding the peat from the walls of the turf-pit. As indicated above, one of the distinguishing features of the invention is that in this process the peat-mass mixed with water is worked so as to constitute a relatively liquid mixture, which may be pumped to the drying-place by means of a pump. According to this invention, it is preferable that this pump be utilized to convey the peat-mass as well as to disintegrate the hard or fibrous components of the peat, so that the peat-mass as a homogenous peat-porridge may be conveyed to the drying-place by means of a pipe-line.

The drawings diagrammatically illustrate the invention.

Fig. 1 is a vertical section through the disintegrator.

Fig. 2 is a detail sectional view of two of the disintegrating blades.

Fig. 3 is a side elevation partly in section, of one of the disintegrator blades.

Fig. 4 is a plan view of the blade shown in Fig. 3.

Fig. 5 is a sectional view of another of the disintegrator blades.

Fig. 6 is a plan view of the blade shown in Fig. 5.

Fig. 7 is a sectional view of still another blade of the disintegrator.

Fig. 8 is a plan view of the blade shown in Fig. 7.

Fig. 9 is a sectional view of a blade of the disintegrator.

Fig. 10 is a plan view of the blade shown in Fig. 9.

Fig. 11 is a vertical section of a modified form of disintegrating device and pump.

Fig. 12 is a sectional plan view of the form shown in Fig. 11.

The liquid peat-mass is pumped up. The pump is driven by an electromotor 16 which is connected, by means of bevel gears 17, to the shaft of the pump. A pipe-line resting on the drying-place is connected to the discharge tube 15 of the pump E. In Figs. 1 to 6 there is represented the special construction of rotary or turbine-pump which is used, partly for lifting and conveying the peat-mass, partly for disintegrating and tearing, at the same time, the solid or fibrous constituents of the liquid peat-mass, so that the latter will acquire the homogeneity desired. In order to attain this object, the pump is constructed as a multi-stage turbine-pump. Fig. 1 shows a four stage turbine-pump. The three upper sections $a$ are alike but the bottommost section $a'$ is built in such a manner that its rotor or vane-wheel has a large inlet area.

Each section consists of a guiding device 3, 5 (Figs. 1, 3 and 4) and a conveying device 1, 2, 4, (Figs. 1, 5, 6, 9 and 10). The conveying device consists of an upwardly flaring annular casing 1, (Fig. 5), inside whereof there is provided on the shaft 11, (Fig. 1) a vane-wheel 2, 4 (Fig. 9) of a shape corresponding to the casing 1. The guiding device consists of an annular casting 3 with guiding blades 5. The rings 1 and 3 are screwed together so as to form a complete turbine-casing. The rotary hubs 2 of the vane-wheels 4 are maintained at their proper level by the central members of the stationary guiding devices 3, 5.

By using a conveying wheel whose diameter is larger at top than at bottom, a better efficiency of the wheel is attained and at the same time, the centrifugal force produced by the rotation is utilized in conveying the peat-mass. In order that the velocity of the mass pumped may be maintained as far as possible, constant within the vane-wheel 4, the hub 2 of this wheel, as it appears from Figs. 1 and 9, is shaped in such a manner that the area of passage will be approximately the same throughout. At the enlarged upper end of the working or conveying portion 2, 4 of each of the turbine-sections, there is provided in conjunction thereto, an upwardly reduced guiding device 3, 5. The reduction is such that the discharge openings of the guiding devices correspond to the inlet openings of the vane-wheels. By means of the vane-wheels, the peat is conveyed upward in slanting or helical direction and is introduced into the subsequent guiding devices whose vanes again impart to the liquid a motion in vertical upward direction. By the transition of the peat-mass from the vane-wheels 2, 4 to the guiding devices 3, 5 and by the corresponding transition from the guiding devices to the subsequent vane-wheels in the pump-mechanism, the peat-mass is vigorously disintegrated and torn by the edges of the vanes 4 and 5, so that it will be an entirely uniform porridge that is pumped through the outlet pipe 15.

The number of sections $a$ in the rotary pump is made as large as demanded by the static head and the resistance against motion. Under certain circumstances, the number of sections may be larger than that which is necessarily required in order to have the peat-mass disintegrated. As any unnecessary disintegration and tearing of the fibrous constituents of the peat-mass means an unnecessary consumption of power, it will be preferable to reduce the number of turbine-sections to the minimum required in order to have the mass disintegrated and, in such case, the necessary head may be produced by means of another pumping device.

Figs. 11 and 12 show a combined pumping device consisting of a turbine-pump with two sections $a$, $a'$ and a centrifugal pump 14 provided above the same on the same shaft 11, the centrifugal pump 14 being disposed in a casing 13 connected to the casing 12 of the rotary pump. The peat porridge which is elevated by the pump is thrown out in the discharge spout 15 whereon the driving motor 16 is placed. The centrifugal pump 13, 14 wherein no disintegration or tearing of the peat-mass takes place requires, in order to produce a certain driving pressure, a smaller consumption of power than a rotary or turbine-pump wherein a comminution will unavoidably take place.

The rotary pump E (Figs. 1 and 11) may be composed exclusively of the sections $a$. It will be preferable, however, to shape the first and bottommost section $a'$, or rather the working member of this section, in such a manner that the inlet passage will be large. As it appears from Figs. 1, 7 and 11, this feature may be attained by the said sections $a'$ being composed of a guiding device 3 of the above mentioned kind of a conveying device consisting of a cylindrical casing 6 and an upwardly enlarged hub 2 and of one or more conveying vanes 8. The velocity of the peat-mass conveyed varies within the passages 2, 6, 8, in the element, and will then be nearly constant. If it is desired to attain a further increase of the inlet area, there may be used, instead of the cylindrical casing 6, a casing conically flaring at bottom.

At the lower end of the rotary pump, i. e. directly below the sharply ground edges 8' of the vane 8, there is frequently provided a stationary and pointed cutter 9. This cutter is attached, by a segment 10, to the casing 3 of the guiding device above. By the co-operation of the cutter 9, 8', larger foreign bodies are comminuted before their passage into the pump.

Another relatively important arrangement in the peat suction-pump consists in the provision, on the lower end of the spindle 11 provided in the casing of the pump, of a vane-wheel 2, 4' (Figs. 1 and 11), which holds larger pieces of roots and similar hard bodies away from the inlet channels of the pump and, at the same time, stirs the peat-porridge, so that the pump will always draw a mixture of nearly uniform composition and consistency.

The conveying and disintegrating device here specified has no suction-valve, and is therefore not likely to become clogged. It needs no priming before being started, and it may work in the peat-mass to be conveyed, without any protection whatever. As the pump acts simultaneously as a disintegrating and mixing machine, it renders superfluous the special cutting and mixing machines heretofore used in the manufacture of peat-fuel.

I claim as my invention:

1. A device for working peat masses, comprising a pump having stationary guiding and rotary elements alternately arranged along the axis of the pump, vanes in the alternately arranged elements providing tortuous passages of constant cross-section extending approximately along the entire length of the pump, the passages being formed by the hubs of the fixed elements being enlarged toward the downward inlet end of the pump, while the hubs of the rotary elements are reduced towards such end, and the surface of the inner annular wall of each element being parallel to the corresponding hub surface.

2. A device according to claim 1 in which said rotary elements and stationary guiding elements have the vanes arranged as conical downwardly tapering blades and the cross-sectional area of the passage in the lowermost guiding element increases from the side of delivery to the side of entry.

3. A device according to claim 1, in combination with a co-axially arranged centrifugal pump for supplying additional propulsive power, the communication between the elements and the centrifugal pump consisting of a relatively long tube without vanes.

4. A device for working peat masses, comprising a pump having stationary guiding and rotary elements alternately arranged along the axis of the pump, vanes in the alternately arranged elements providing tortuous passages of constant cross-section extending approximately along the entire length of the pump, the passages being formed by the hubs of the fixed elements being enlarged toward the downward inlet end of the pump, while the hubs of the rotary elements are reduced toward such end, said rotary elements and stationary guiding elements having the vanes arranged as conical downwardly tapering blades, and the surface of the inner annular wall of each element being parallel to the corresponding hub surface, the cross-sectional area of the passage of the lowermost guiding element increasing from the side of delivery to the side of entry in combination with a co-axially arranged centrifugal pump for supplying additional propulsive power.

5. A device according to claim 1, there being a stirring wheel positioned ahead of said elements, whereby to prevent clogging of the device.

6. A device according to claim 4 in which there is a stirring wheel positioned in advance of the elements, to prevent clogging of the device.

In testimony whereof he affixes his signature.

EDUARD PETER-THEODOR
REINHOLDOWITSCH ULMANN.